US009288073B2

(12) United States Patent
Yoshimura et al.

(10) Patent No.: US 9,288,073 B2
(45) Date of Patent: Mar. 15, 2016

(54) COMMUNICATION SYSTEM AND TRANSMISSION UNIT EMPLOYED IN SAME

(71) Applicant: Panasonic Corporation, Osaka (JP)

(72) Inventors: Yuichi Yoshimura, Osaka (JP); Tadashi Matsumoto, Hyogo (JP); Shinji Sakasegawa, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 146 days.

(21) Appl. No.: 14/355,604

(22) PCT Filed: Oct. 23, 2012

(86) PCT No.: PCT/JP2012/077293
§ 371 (c)(1),
(2) Date: May 1, 2014

(87) PCT Pub. No.: WO2013/069444
PCT Pub. Date: May 16, 2013

(65) Prior Publication Data
US 2014/0286353 A1 Sep. 25, 2014

(30) Foreign Application Priority Data

Nov. 7, 2011 (JP) .................................. 2011-244011

(51) Int. Cl.
*H04B 10/114* (2013.01)
*H04L 12/407* (2006.01)
*H04L 12/40* (2006.01)

(52) U.S. Cl.
CPC .............. *H04L 12/407* (2013.01); *H04L 12/40* (2013.01)

(58) Field of Classification Search
CPC ....... H04W 4/001; H04W 4/20; H04W 4/008; H04L 12/2803; H04L 2012/2841; H04L 12/1822; H04L 12/185; H04L 5/0023; H04L 5/0042
USPC .............. 370/329, 315; 398/118; 348/211.99, 348/308, 302
See application file for complete search history.

(56) References Cited

U.S. PATENT DOCUMENTS 5,805,822 A * 9/1998 Long ................... G06F 11/1443
709/230
6,175,944 B1 * 1/2001 Urbanke ............... H04L 1/0057
714/752

(Continued)

FOREIGN PATENT DOCUMENTS

JP  54-040303 B  12/1979
JP  54-040304 B  12/1979

(Continued)

OTHER PUBLICATIONS

International Search Report for corresponding International Application No. PCT/JP2012/077293 mailed Jan. 15, 2013.

(Continued)

*Primary Examiner* — Dang Ton
*Assistant Examiner* — Sai Aung
(74) *Attorney, Agent, or Firm* — Renner, Otto, Boisselle & Sklar, LLP

(57) ABSTRACT

Transmission and reception of data can be performed between first terminal communicating by transmission signal and second terminal communicating by superimposition signal superimposed on transmission signal. When detecting interrupt signal generated by first monitoring terminal, in interrupt segment of transmission signal, transmission unit makes response requesting unit transmit response requesting data to first monitoring terminal in transmission segment. Response receiving unit receives response data that is transmitted in reply segment, in response to response requesting data, by first monitoring terminal that has generated interrupt signal. Segment securing unit transmits, in transmission segment, securing data for securing reply segment for superimposition of superimposition signal, by prohibiting transmission of response data in reply segment, with specific response data as trigger. Transmission unit makes superimposition communication unit transmit, to second control terminal, control data in reply segment secured through securing data, with superimposition signal.

10 Claims, 9 Drawing Sheets

(56) References Cited

U.S. PATENT DOCUMENTS

| | | | |
|---|---|---|---|
| 2002/0071436 A1* | 6/2002 | Border | H04B 7/18582 370/395.32 |
| 2008/0267217 A1* | 10/2008 | Colville | H04L 47/10 370/477 |
| 2009/0323667 A1* | 12/2009 | Doi | H04W 8/26 370/349 |
| 2010/0085964 A1* | 4/2010 | Weir | H04L 1/0084 370/389 |
| 2014/0286644 A1* | 9/2014 | Oshima | H04B 10/11 398/118 |

FOREIGN PATENT DOCUMENTS

| | | |
|---|---|---|
| JP | 57-037264 B | 8/1982 |
| JP | 2005-277633 A | 10/2005 |
| JP | 2008-061233 A | 3/2008 |
| JP | 2009-225328 A | 10/2009 |

OTHER PUBLICATIONS

Form PCT/ISA/237 for corresponding International Application No. PCT/JP2012/077293 dated Jan. 15, 2013.

* cited by examiner

COMMUNICATION SYSTEM AND TRANSMISSION UNIT EMPLOYED IN SAME

TECHNICAL FIELD

This invention relates to a communication system in which a first terminal that communicates by means of a transmission signal and a second terminal that communicates by means of a superimposition signal superimposed on the transmission signal are connected to the same communication line, and a transmission unit employed in the communication system.

BACKGROUND ART

Heretofore, communication systems in which a transmission unit (master) and a plurality of terminal devices (slaves) are connected to a transmission channel and communication is performed between the transmission unit and each of the terminal devices are in widespread use. An example of this kind of communication systems is a system in which the transmission unit monitors states of the terminal devices periodically, and when there is a change in the state of one of the terminal devices, the transmission unit transmits a signal to another terminal device so as to perform processing corresponding to the state change (e.g., refer to Japanese Patent Publication No. 1180690, Japanese Patent Publication No. 1195362, and Japanese Patent Publication No. 1144477).

Note that, the communication system having the aforementioned configuration is a system originally used for on-off control of lighting apparatuses or the like, and is not suited to transmitting information having a relatively large data amount such as data represented by an analog quantity, since the communication speed is slow.

In view of this, a communication system that is formed by mixing an existing communication system in which terminal devices communicate with each other via a transmission unit and a communication system in which terminal devices directly communicate with each other by peer-to-peer (P2P) communication has been proposed (e.g., see Japanese Unexamined Patent Application Publication No. 2009-225328). In this communication system, since first terminals (first communication terminals) that communicate via the transmission unit (master) share a communication line (transmission channel) with second terminals (second communication terminals) that communicate with each other directly, the second terminals can be easily added to the existing communication system. The first terminals communicate by a transmission signal (signal conforming to a first protocol) that is repeatedly transmitted to the communication line from the transmission unit, and the second terminals perform higher speed communication by a superimposition signal (signal conforming to a second protocol) that is superimposed on the transmission signal.

Here, the transmission signal is a time-division signal that is divided, frame by frame, into a plurality of regions (periods) in the time axis direction, and some of the regions are assigned as superimposition allowable segments (communication suitable periods) in which the superimposition signal can be superimposed. That is, the second terminals communicate by the superimposition signal that is transmitted on the communication line, on which the transmission signal is also transmitted, in the superimposition allowable segments assigned to part of the transmission signal.

Incidentally, in the communication system described in aforementioned Japanese Unexamined Patent Application Publication No. 2009-225328, although the first terminals and the second terminals share the communication line, communication is performed between the first terminals or between the second terminals independently without interfering with each other, and transmitting and receiving data between a first terminal and a second terminal is not considered. However, in recent years, a flexible system is desired, in which for example an apparatus connected to the second terminal can be controlled based on data input from the first terminal to the transmission unit. In order to achieve this, it is required that transmission and reception of data are performed between the first and second terminals.

DISCLOSURE OF THE INVENTION

It is an object of the present invention to provide a communication system in which transmission and reception of data can be performed between a first terminal that communicates by a transmission signal and a second terminal that communicates by a superimposition signal that is superimposed on the transmission signal, and a transmission unit employed in the same.

A communication system according to one aspect of the present invention includes a transmission unit that repeatedly transmits a transmission signal to a communication line, a first terminal that communicates by the transmission signal, and a second terminal that communicates by a superimposition signal that is superimposed on the transmission signal. The transmission unit, the first terminal and the second terminal are connected to the communication line. The transmission signal is a time-division signal that is divided, frame by frame, into a plurality of regions in a time axis direction. The plurality of regions include: an interrupt segment for detecting presence or absence of an interrupt signal that is generated by the first terminal; a transmission segment for transmitting data to the first terminal; and a reply segment that is a time slot for receiving response data from the first terminal. The transmission unit includes: a response requesting unit; a response receiving unit; a segment securing unit; and a superimposition communication unit. The response requesting unit is configured to transmit, when detecting the interrupt signal in the interrupt segment, response requesting data to the first terminal in the transmission segment with the transmission signal. The response receiving unit is configured to receive the response data that is transmitted in the reply segment with the transmission signal, in response to the response requesting data, by the first terminal that has generated the interrupt signal. The segment securing unit is configured to transmit, in the transmission segment with the transmission signal, securing data for securing the reply segment for superimposition of the superimposition signal, by prohibiting transmission of the response data in the reply segment, with specific response data as a trigger. The superimposition communication unit is configured to transmit, to the second terminal, data in the reply segment secured through the securing data, with the superimposition signal.

In this communication system, preferably, the segment securing unit is configured to determine a frequency of transmission of the securing data, from one to a plurality of frequencies, according to an amount of the data to be transmitted to the second terminal, so that the reply segment is secured longer in accordance with increase of the amount of the data to be transmitted to the second terminal.

In this communication system, preferably, when the second terminal transmits confirmation data to the superimposition communication unit in response to the data transmitted from the superimposition communication unit, the segment securing unit is configured to transmit the securing data again in a subsequent transmission segment after the reply segment in which the data has been transmitted from the superimposition communication unit, in order to secure, for receiving the confirmation data, a subsequent reply segment after the subsequent transmission segment.

In this communication system, preferably, when receiving the response data in an identical reply segment from more than one the first terminal, the response receiving unit is configured to preferentially handle the response data transmitted from a first terminal having a higher priority level, from among priority levels that are previously associated with addresses of more than one the first terminal respectively.

In this communication system, preferably, the first terminal includes: a first monitoring terminal configured to monitor a monitoring input that is generated by a switch or a sensor, transmit the interrupt signal to the transmission unit, and transmit the response data in response to the response requesting data; and a first control terminal configured to receive control data from the first monitoring terminal through the transmission unit, and control one or more first loads based on the control data. In this case, the second terminal includes a second control terminal configured to control one or more second loads based on control data that is included in the superimposition signal transmitted from the transmission unit. The transmission unit is configured to store a control table in which an address of the first monitoring terminal is associated with an address of the second control terminal. The transmission unit is configured to determine, based on the control table, whether a transmission destination of control data included in the response data received from the first monitoring terminal is the first control terminal or the second control terminal, and make the segment securing unit transmit the securing data when determining that the transmission destination is the second control terminal.

A transmission unit according to another aspect of the invention is used for a communication system in which a first terminal that communicates by a transmission signal and a second terminal that communicates by a superimposition signal superimposed on the transmission signal are connected to a communication line. The transmission unit is connected to the communication line. The transmission unit includes a transmission communication unit, a response requesting unit, a response receiving unit, a segment securing unit, and a superimposition communication unit. The transmission communication unit is configured to repeatedly transmit, to the communication line, the transmission signal that is a time-division signal divided, frame by frame, into a plurality of regions in a time axis direction. The plurality of regions include an interrupt segment for detecting presence or absence of an interrupt signal that is generated by the first terminal, a transmission segment for transmitting data to the first terminal, and a reply segment that is a time slot for receiving response data from the first terminal. The response requesting unit is configured to transmit, when detecting the interrupt signal in the interrupt segment, response requesting data to the first terminal in the transmission segment with the transmission signal. The response receiving unit is configured to receive the response data that is transmitted in the reply segment with the transmission signal, in response to the response requesting data, by the first terminal that has generated the interrupt signal. The segment securing unit is configured to transmit, in the transmission segment with the transmission signal, securing data for securing the reply segment for superimposition of the superimposition signal, by prohibiting transmission of the response data in the reply segment, with specific response data as a trigger. The superimposition communication unit is configured to transmit, to the second terminal, data in the reply segment secured through the securing data, with the superimposition signal.

According to the aspect of the invention, it is possible to perform transmission and reception of data between a first terminal that communicates by a transmission signal, and a second terminal that communicates by a superimposition signal that is superimposed on the transmission signal.

BRIEF DESCRIPTION OF THE DRAWINGS

Preferred embodiments of the invention will now be described in further details. Other features and advantages of the present invention will become better understood with regard to the following detailed descri-ption and accompanying drawings where.

BEST MODE FOR CARRYING OUT THE INVENTION (Embodiment 1)

Figure 1:
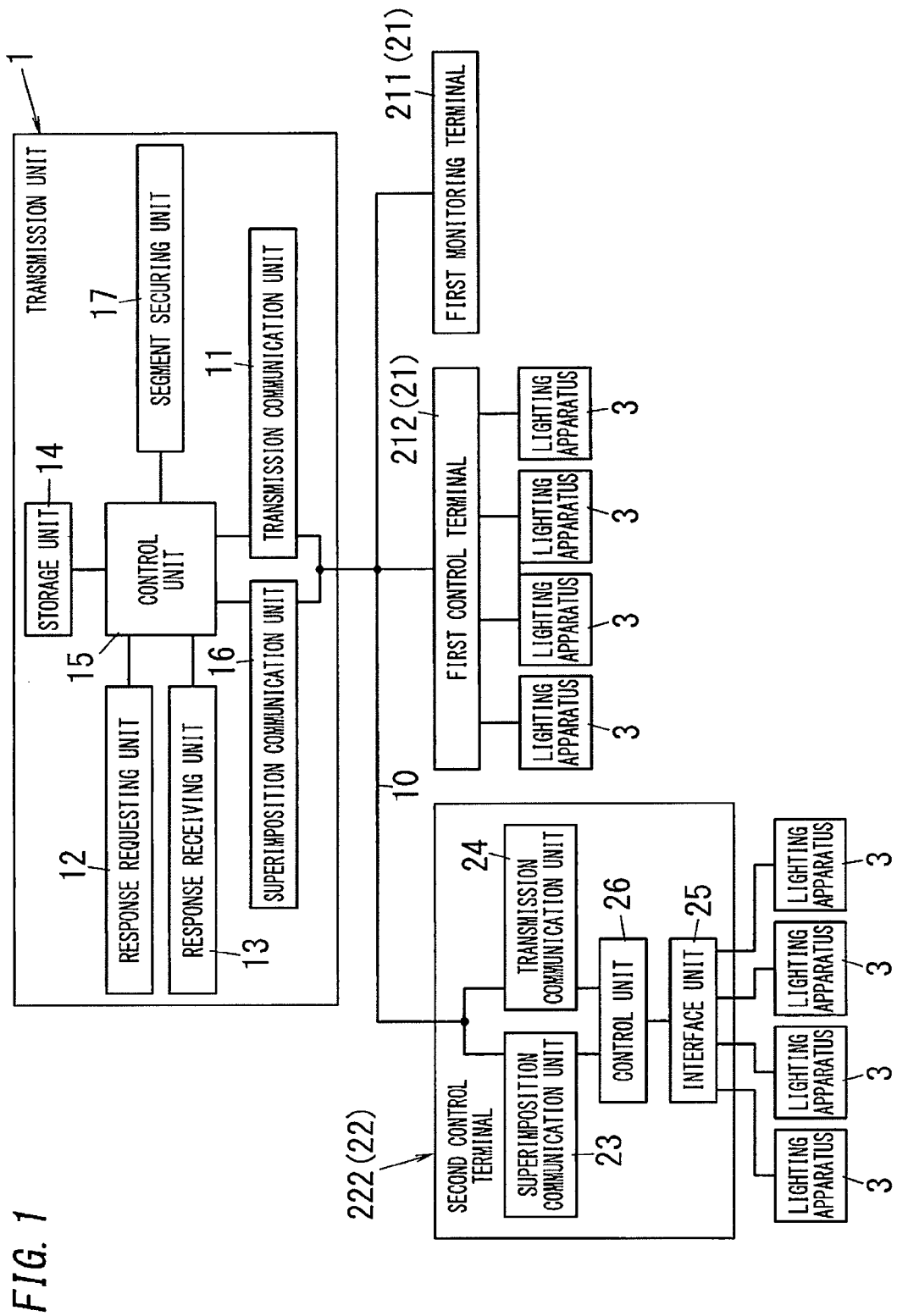
FIG. 1 is a block diagram illustrating a schematic configuration of a communication system according to Embodiment 1.
Figure 4:
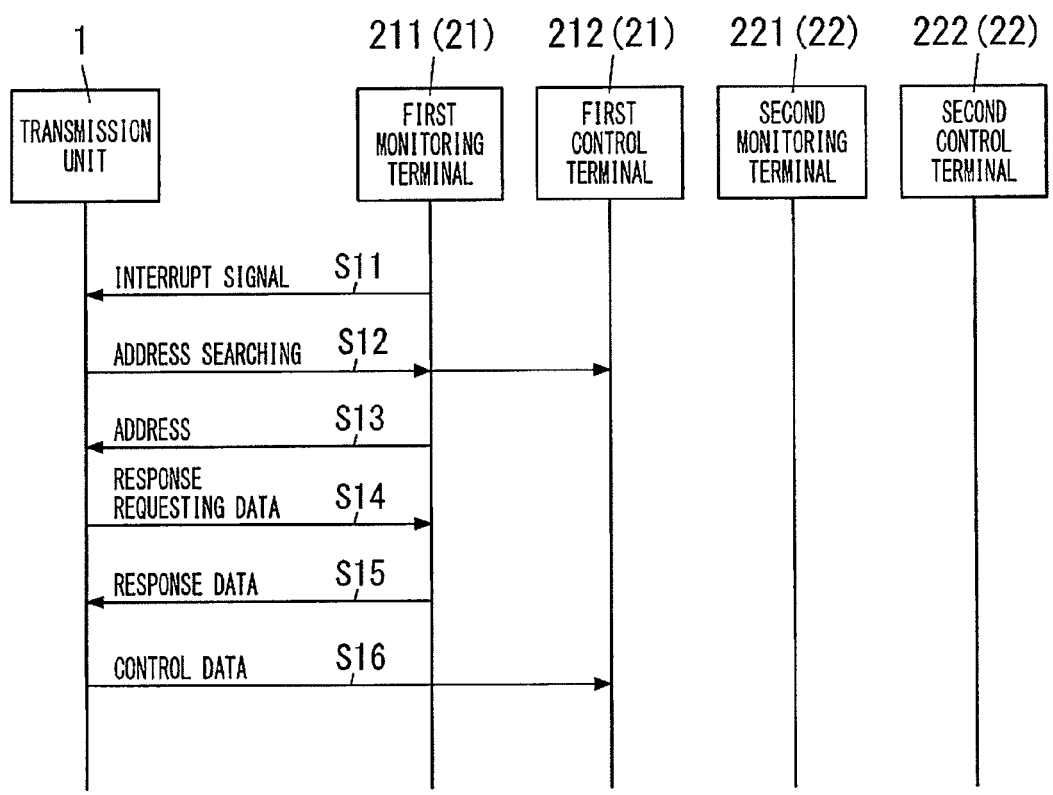
FIG. 4 is an explanatory diagram illustrating the operation of the basic system of the communication system according to Embodiment 1.

A communication system of the present embodiment includes, as shown in FIG. 1 for example, a transmission unit 1 serving as a master, and first terminals 21 and second terminals 22 serving as slaves. The transmission unit 1, first terminals 21 and second terminals 22 are connected to a two-wire communication line 10. In FIG. 1 (and similarly in FIGS. 2, 4, and 6), the first terminals 21 are denoted as first monitoring terminals or first control terminals and the second terminals 22 are denoted as second monitoring terminals or second control terminals. The reason for this will be described later. In this communication system, each first terminal 21 communicates by a transmission signal (signal conforming to a first protocol) transmitted on the communication line 10, and each second terminal 22 communicates by a superimposition signal (signal conforming to a second protocol) superimposed on the transmission signal.

Figure 2:
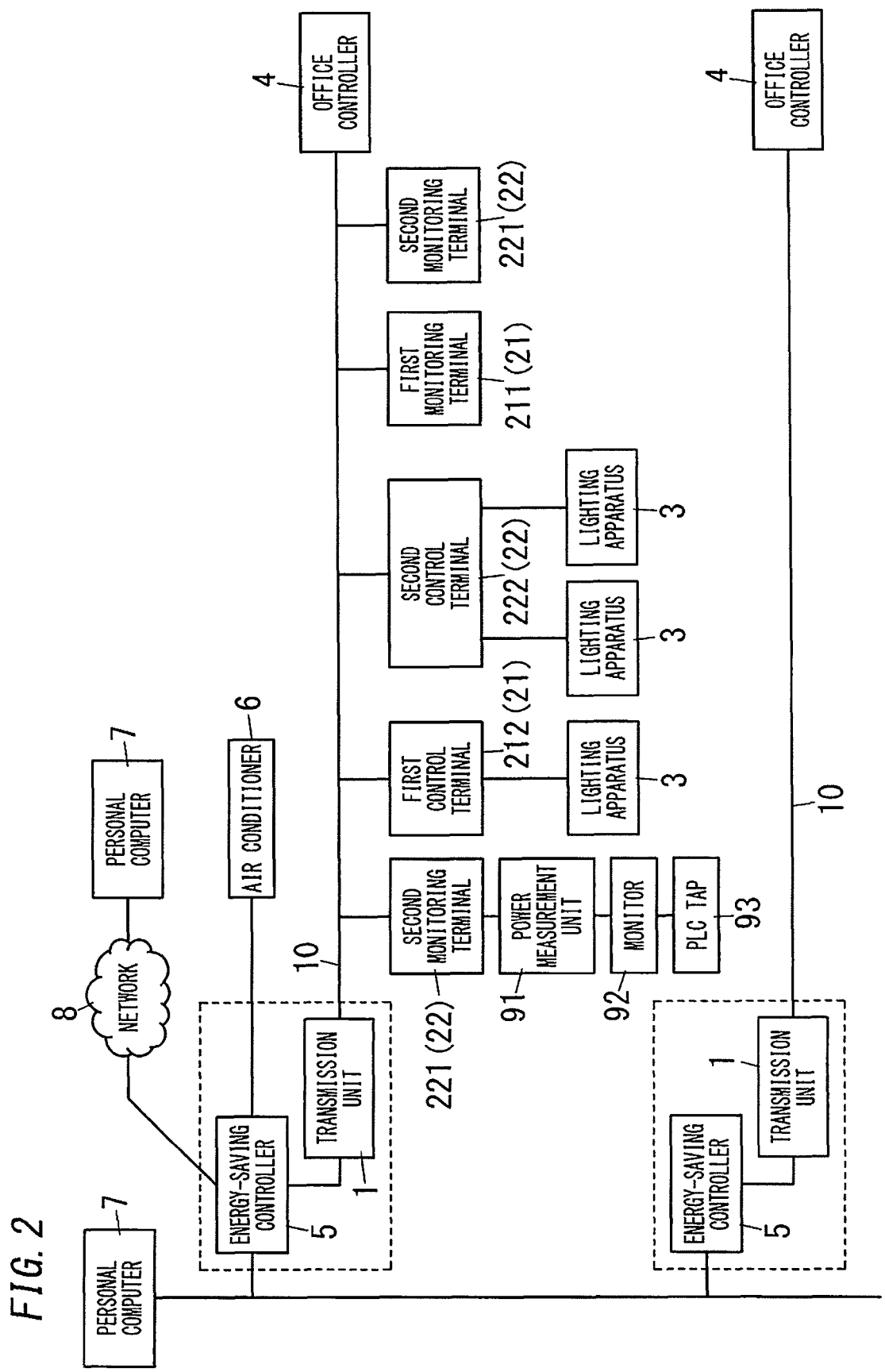
FIG. 2 is a configuration diagram of a lighting system that uses the communication system according to Embodiment 1.

FIG. 2 illustrates an example in which the communication system is applied to a lighting system for controlling lighting apparatuses 3 in an office building or the like. In the example shown in FIG. 2, one transmission unit 1 is provided for each area (floor, for example), and the one or more first terminals 21 and the one or more second terminals 22 are connected to the communication line 10 to which the transmission unit 1 is connected. Further, an office controller 4 that performs centralized monitoring control on the lighting control system is connected to the communication line 10.

Moreover, the transmission unit 1 is connected to an energy-saving controller 5 that is a device on an upstream side thereof. The energy-saving controller 5 is provided for each area (floor, for example), and performs overall monitoring control on an air conditioner 6 in addition to the lighting system to which the communication system is applied. The energy-saving controllers 5 in a plurality of areas are connected to a personal computer 7 having a browser function via a network 8 such as the Internet, or via a LAN, and are configured so as to be monitored by the personal computer 7. Note that, in the example shown in FIG. 2, a power measurement unit 91 is connected to one of the second monitoring terminals 221, and the power measurement unit 91 is configured to measure power consumption of an apparatus that is connected to a PLC tap 93 via a monitor 92.

The first terminals 21 are connected in parallel to the transmission unit 1 via the communication line 10. The transmission unit 1 and the first terminals 21 constitute a time division multiplex transmission system (hereinafter referred to as a "basic system") in which data transmission from the transmission unit 1 to each first terminal 21 and data transmission from each first terminal 21 to the transmission unit 1 are performed in a time-division manner. Hereinafter, first, a schematic configuration of the basic system will be described.

In the basic system, the first terminals 21 are classified into one of a first monitoring terminal 211 that monitors a monitoring input of a switch (not shown) such as a wall switch and a first control terminal 212 that includes a relay (not shown) and performs on-off control or the like of loads (here, first loads, lighting apparatuses 3). Here, each of the first terminals 21 stores its own address assigned individually in advance in its own memory (not shown). Note that, the first monitoring terminal 211 may be configured to monitor a monitoring input not only generated by a switch but also generated automatically by a sensor such as a motion detector.

The transmission unit 1 includes, as shown in FIG. 1, a transmission communication unit 11 that transmits a transmission signal to the communication line 10, a response requesting unit 12 that transmits response requesting data to the first terminal 21, a response receiving unit 13 that receives response data from the first terminal 21, a storage unit 14, and a control unit 15. Further, the transmission unit 1 includes a superimposition communication unit 16 and a segment securing unit 17. However, since the superimposition communication unit 16 and the segment securing unit 17 provide functions that are not used in the basic system, detailed description thereof will be given later. The control unit 15 is configured to control operations of the response requesting unit 12, the response receiving unit 13, the superimposition communication unit 16, and the segment securing unit 17. In the present embodiment, the transmission unit 1 is configured by a microcomputer as a main constituent element, and functions of the units are realized by executing programs stored in the storage unit 14.

The response requesting unit 12 is configured to transmit the response requesting data with the transmission signal via the transmission communication unit 11. The response receiving unit 13 is configured to receive, via the transmission communication unit 11, the response data that has been transmitted from the first terminal 21 with the transmission signal.

The transmission unit 1 stores a control table in which the first monitoring terminals 211 are associated with the corresponding first control terminals 212 by addresses in the storage unit 14. Here, for example, when the first monitoring terminal 211 includes switches for a plurality of circuits, the one switch that has actually been operated cannot be specified with only the terminal address that is unique to the first monitoring terminal 211, since all the switches in the first monitoring terminal 211 are associated with the same address.

In order to specify the one switch that has actually been operated, in the first monitoring terminal 211, a load number is assigned to each of the switches, and addresses in which the load numbers are each added after the terminal address of the first monitoring terminal 211 are used as addresses (identifiers) unique to the respective switches. Similarly, in the first control terminal 212, a load number is assigned to each of the relays, and addresses in which the load numbers are each added after the terminal address of the first control terminal 212 are used as addresses (identifiers) unique to the respective relays. In the control table, addresses unique to the respective switches are associated with addresses unique to the respective relays in one-to-one or one-to-many correspondence.

Next, an operation of the basic system will be described.

Figure 3:
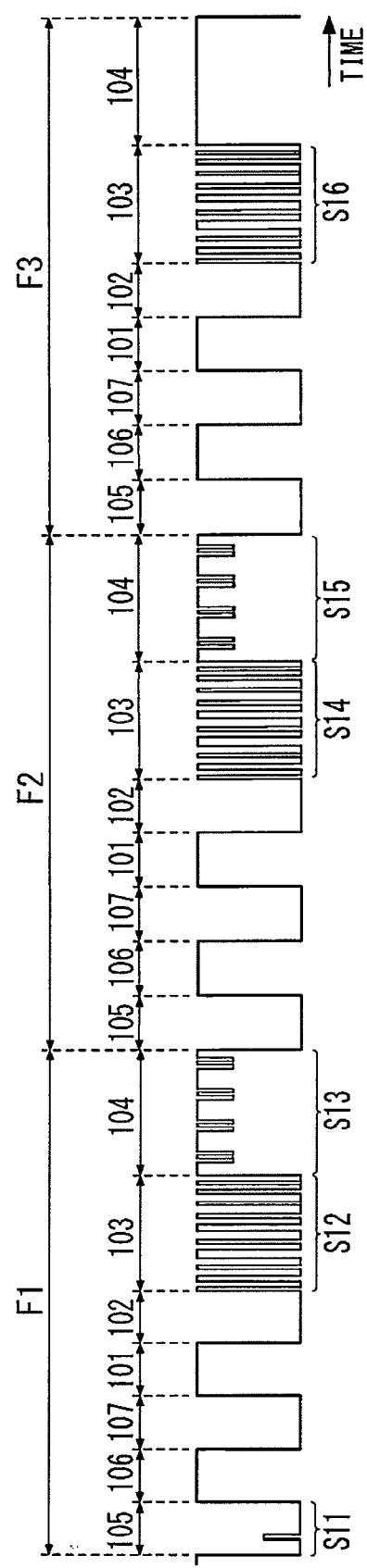
FIG. 3 is an explanatory diagram illustrating an operation of a basic system of the communication system according to Embodiment 1.

The transmission unit 1 is configured to repeatedly transmit a transmission signal which is a time-division signal to the communication line 10. The transmission signal is constituted by a voltage waveform in a format in which one cycle of the waveform is divided into a plurality of regions in the time axis direction, as shown in FIG. 3. That is, the transmission signal is a bipolar (±24V) time division multiplex signal that is constituted by seven segments consisting of a spare interrupt segment 101, a spare segment 102, a transmission segment 103, a reply segment 104, an interrupt segment 105, a short-circuit detection segment 106, and a pause segment 107. Note that, in the example shown in the diagram, one frame (F1, F2, . . . ) in the transmission signal begins with the interrupt segment 105 and ends with the reply segment 104. However, one frame is not limited thereto, and for example, one frame may begin with the reply segment 104 and end with the transmission segment 103.

The spare interrupt segment 101 is a period for detecting occurrence of a secondary interrupt, the spare segment 102 is a period set with the interrupt segment 105 and the short-circuit detection segment 106, and the transmission segment 103 is a period for transmitting data to the first terminal 21. The reply segment 104 is a time slot for receiving response data from the first terminal 21, the interrupt segment 105 is a period for detecting occurrence of an interrupt signal described later, and the short-circuit detection segment 106 is a period for detecting a short circuit. The pause segment 107 is a period for processing that is not finished in an assigned time slot.

The transmission unit 1 is normally configured to transmit a transmission signal with mode data indicating a normal mode, and perform consecutive polling in which address data included in the transmission segment 103 of this transmission signal is changed sequentially so as to access the first terminals 21 sequentially. When the consecutive polling is performed, the first terminal 21 whose own address matches the address data included in the transmission segment 103 receives data included in the transmission segment 103 and transmits response data to the transmission unit 1 in the subsequent reply segment 104 (that is, the first reply segment 104 after the transmission segment 103). Here, the first terminal 21 is configured to transmit the response data by a current mode signal (a signal transmitted by short-circuiting the communication line 10 via an appropriate low impedance) that is synchronized with the reply segment 104 of the transmission signal. Note that electric power to an internal circuit of the first terminal 21 is supplied by rectifying and stabilizing the transmission signal transmitted via the communication line 10.

On the other hand, the first terminal 21 serving as the first monitoring terminal 211 is configured to generate an interrupt signal in synchronization with the interrupt segment 105 of the transmission signal when detecting a monitoring input. Hereinafter, an operation of the basic system in the communication system shown in FIG. 1 when an interrupt signal is generated in the first monitoring terminal 211 will be described with reference to FIGS. 3 and 4.

The transmission unit 1, upon detecting the interrupt signal generated by the first monitoring terminal 211 in the interrupt segment 105 of a first frame F1 of the transmission signal (S11 in FIGS. 3 and 4), switches the mode data included in the transmission segment 103 of the transmission signal from the normal mode to an interrupt polling mode. In the interrupt polling mode, the transmission unit 1 performs address searching in which response requesting data composed of upper bits of an address is transmitted with the response requesting unit 12 in the transmission segment 103 of the transmission signal (S12), while the address (upper bits) being changed sequentially. The first monitoring terminal 211 that has generated the interrupt signal transmits, if the address (upper bits) in the response requesting data matches the upper bits of its own address, the lower bits of its own address as the response data to the transmission unit 1 in the reply segment 104 of the first frame F1 (S13). Accordingly, the transmission unit 1 receives, with the response receiving unit 13, the address of the first monitoring terminal 211 that has generated the interrupt signal as the response data in the first frame F1.

The transmission unit 1, upon acquiring the address of the first monitoring terminal 211 that has generated the interrupt signal, transmits response requesting data from the response requesting unit 12 to the first monitoring terminal 211 by designating the address in the transmission segment 103 of a second frame F2 that is a frame subsequent to the first frame F1 (S14). The first monitoring terminal 211, upon receiving the response requesting data including its own address and with responding thereto, transmits monitoring data that includes a load number and an on/off state of a switch corresponding to the monitoring input in the reply segment 104 of the second frame F2 as response data to the transmission unit 1 (S15).

The transmission unit 1, upon receiving the response data including the monitoring data with the response receiving unit 13, transmits control data to a first control terminal 212 that is associated with this monitoring data in the control table, in the transmission segment 103 of a third frame F3 that is a frame subsequent to the second frame F2 (S16). With this, the first control terminal 212 that has received the control data controls turning on/off of lighting apparatuses 3 according to the control data.

As described above, in the basic system, the first terminals 21 (first monitoring terminal 211, first control terminal 212) communicate with each other via the transmission unit 1, in conformity with a protocol of a polling/selecting method (first protocol).

Incidentally, in the communication system according to the present embodiment, the second terminal 22 is configured to perform communication by a superimposition signal superimposed on the transmission signal, while sharing the communication line 10 with the basic system described above. In the present embodiment, since the transmission unit 1 includes the superimposition communication unit 16 (see FIG. 1) that performs communication conforming to the second protocol with the superimposition signal, communication conforming to the second protocol is possible not only between the second terminals 22, but also between the transmission unit 1 and the second terminal 22.

The second terminals 22 are, similarly to the first terminals 21, classified into one of two kinds, that is a second monitoring terminal 221 that monitors the monitoring input from a sensor or the like and a second control terminal 222 that controls loads (here, second loads, lighting apparatuses 3). Here, each of the second terminals 22 stores its own address assigned individually in advance in its own memory (not shown). Note that, an address area that is assignable to the first terminal 21 is different from that of the second terminal 22. Hereinafter, description will be given assuming a case where addresses "1" to "128" are available to the communication system as a whole, "1" to "64" are assigned to the address area of the first terminal 21, and "65" to "128" are assigned to the address area of the second terminal 22.

Note that, as for the second terminal 22, when a plurality of sensors or loads are connected to one second terminal 22, a unique address is not assigned to the second terminal 22, but is assigned to each of the sensors or loads. That is, to a second control terminal 222 having four loads connected thereto, for example, four addresses in total such as "65", "66", "67", and "68" are assigned.

The second terminal 22 includes, as shown in FIG. 1, a (terminal side) superimposition communication unit 23 that performs communication by the superimposition signal, a (terminal side) transmission communication unit 24 that is capable of at least receiving the transmission signal, an interface unit 25, and a (terminal side) control unit 26. To the interface unit 25, sensor devices and lighting apparatuses 3 described later are connected. The control unit 26 is configured to control operations of the superimposition communication unit 23, the transmission communication unit 24, and the interface unit 25. In the present embodiment, the second terminal 22 is configured by a microcomputer as a main constituent element, and functions of the units are realized by executing programs stored in the memory (not shown).

Here, the superimposition signal is a signal whose frequency is sufficiently higher than that of the transmission signal, and a data amount that is transmittable in one frame (of the transmission signal) is sufficiently large. Therefore, a communication speed of communication conforming to the second protocol can be increased compared with communication conforming to the first protocol. The communication conforming to the second protocol is appropriate for transmission of information having a relatively large data amount such as an analog quantity.

Accordingly, the second monitoring terminal 221 has sensor devices such as an image sensor (not shown) and a power measurement unit 91 (see FIG. 2) connected thereto, and is used for communication of monitoring data having a relatively large data amount. The second control terminal 222 is not used for simple on-off control of lighting apparatuses 3, but is used for communication of control data having a relatively large data amount for dimming control, color adjustment control, or the like. That is, the second control terminal 222 is connected to lighting apparatuses 3 that are capable of dimming control and color adjustment control, and is configured to control the lighting apparatuses 3 according to control data that is transmitted with the superimposition signal.

Note that, the monitoring data is generated by the sensor device, and the second monitoring terminal 221 functions as an adapter that converts the monitoring data inputted from the sensor device and transmits the converted result to the communication line 10. Similarly, the control data is generated by the transmission unit 1, and the second control terminal 222 functions as an adapter that converts the control data received from the communication line 10 so as to conform to a standard of the lighting apparatus 3, and outputs the converted result to the lighting apparatus 3. Note that, an example of the standard of the lighting apparatus 3 connected to the second control terminal 222 is a DALI (Digital Addressable Lighting Interface).

The second terminal 22 and the transmission unit 1 have a function of monitoring the transmission signal used in the basic system and of analyzing the data transmission condition of the transmission signal (hereinafter referred to as "state"). Here, the second terminal 22 monitors the transmission signal with the transmission communication unit 24, and the transmission unit 1 monitors the transmission signal with the transmission communication unit 11. The second terminal 22 and the superimposition communication unit 16 are configured to determine whether or not the state indicates an appropriate condition for superimposing the superimposition signal, and superimpose the superimposition signal on the transmission signal at a timing at which the state is determined to be appropriate for the transmission.

In the present embodiment, the second terminal 22 and the superimposition communication unit 16 use the reply segment 104 (see FIG. 3), as a superimposition allowable segment, in the transmission signal for superimposing the superimposition signal. That is, in the reply segment 104, even when the superimposition signal is superimposed on the transmission signal, communication conforming to the first protocol is not affected and the superimposition signal is also unlikely to be affected by the transmission signal. Further, the reply segment 104 has a longer period in which the transmission signal stays at a high level or a low level and a higher occupancy ratio in one frame of the transmission signal, compared with the spare interrupt segment 101, the spare segment 102, and the pause segment 107, and as a result the reply segment 104 is appropriate for superimposing the superimposition signal.

The other segments (transmission segment 103, interrupt segment 105, and short-circuit detection segment 106) have a relatively short period in which the transmission signal stays at a high level or a low level, and communication conforming to the first protocol is likely to be affected when the superimposition signal is superimposed in these segments. Moreover, when the superimposition signal is superimposed in the other segments described above, the superimposition signal is also likely to be affected by signals (interrupt signal and transmission data) that are transmitted and received between the transmission unit 1 and the first terminal 21. Therefore, in the present embodiment, the segments other than the reply segment 104 are segments that are not used for superimposing the superimposition signal (hereinafter referred to as "superimposition prohibited segment").

Note that, rising and falling periods of the transmission signal are also not appropriate for superimposing the superimposition signal due to the effect of harmonic noise and the influence of a transient response accompanied by a voltage inversion of a signal. Therefore, in the reply segment 104 of the transmission signal, a period of a predetermined time (such as 300 μs) after the segment is changed to (rising period of) the reply segment 104 is a superimposition prohibited segment.

The second terminal 22 and the superimposition communication unit 16 are configured to determine whether the segment is the superimposition allowable segment or the superimposition prohibited segment based on a result of analyzing the state of the transmission signal and transmit a superimposition signal only when the segment is determined to be the superimposition allowable segment. The second terminal 22 and the superimposition communication unit 16, by superimposing the superimposition signal only in the superimposition allowable segment of the transmission signal in synchronization with the transmission signal in this way, avoid interference between communication conforming to the first protocol and communication conforming to the second protocol that share the communication line 10.

Here, the second terminal 22 and the superimposition communication unit 16 are configured to stop, when an amount of data that is to be transmitted is too large to be transmitted in one superimposition allowable segment (reply segment 104), the communication at the end of the superimposition allowable segment, and transmit the remaining data in the subsequent superimposition allowable segment. That is, the second terminal 22 and the superimposition communication unit 16 are configured to combine, when receiving data that is divided and transmitted with the superimposition signal in different frames, the data that have been transmitted separately to form one piece of data, and divide the data in lengths such that the divided data can be superimposed in the superimposition allowable segment when transmitting the superimposition signal.

Note that electric power to the second terminal 22 is, similarly to the first terminal 21, supplied by a method in which the transmission signal transmitted from the transmission unit 1 via the communication line 10 is rectified and stabilized (centralized power supply method). However, the power supply is not limited to this configuration and the electric power to the second terminal 22 may be supplied by a method in which the commercial power supply is rectified and stabilized (localized power supply method).

Here, in the communication system of the present embodiment, the first terminal 21 and the second terminal 22 not only share the communication line 10, but are configured to be capable of transmitting and receiving data therebetween via the transmission unit 1. Specifically, in the control table in the storage unit 14 of the transmission unit 1, an address of the first monitoring terminal 211 (address unique to each switch) is associated with an address of the second control terminal 222 (address unique to each load). Accordingly, the transmission unit 1 is capable of controlling loads (lighting apparatuses 3) that is connected to the second control terminal 222 in accordance with a monitoring input generated in the first monitoring terminal 211.

In the present embodiment, because the second terminal 22 and the superimposition communication unit 16 use the reply segment 104 of the transmission signal, as the superimposition allowable segment for superimposing the superimposition signal, it is required to avoid interference between the response data transmitted from the first terminal 21 to the transmission unit 1 and the superimposition signal in the reply segment 104.

Therefore, in the communication system of the present embodiment, the transmission unit 1 includes the segment securing unit 17 that transmits, in the transmission segment 103 of the transmission signal, securing data so as to secure the subsequent reply segment 104 (that is, the first reply segment 104 after the transmission segment 103) for superimposition of the superimposition signal.

The segment securing unit 17 is configured to transmit, with specific response data as a trigger, the securing data from the transmission communication unit 11 in synchronization with the transmission segment 103 of the transmission signal. Here, the securing data is data for securing the subsequent reply segment 104 for superimposition of the superimposition signal by prohibiting transmission of response data in the subsequent reply segment 104 (that is, the first reply segment 104 after the transmission of securing data), and is dummy data composed of an empty packet having no specific meaning for example. That is, since the first terminal 21 transmits response data only when its own address (or upper bits) is included in the response requesting data transmitted in the transmission segment 103, none of the first terminals 21 transmit response data in the subsequent reply segment 104 after the transmission segment 103 in which the securing data is transmitted. Therefore, the subsequent reply segment 104 after the transmission segment 103 in which the securing data is transmitted from the segment securing unit 17 is secured for superimposition of the superimposition signal without response data being transmitted from the first terminal 21.

As a trigger (specific response data) to transmit the securing data, the segment securing unit 17 uses response data that is associated with control data to the second terminal 22, among response data from the first terminal 21. That is, in the basic configuration, the first monitoring terminal 211 that has generated an interrupt signal transmits, to the transmission unit 1, two kinds of response data: response data including its own address (lower bits); and response data including monitoring data (a load number and an on/off state of a switch). The latter (response data including the monitoring data) of the two kinds of response data is associated with the second terminal 22 in the control table of the transmission unit 1. Accordingly, in the present embodiment, the segment securing unit 17 is configured to transmit the securing data, with the response data including the monitoring data associated with the second terminal 22 in the control table as a trigger.

In other words, the transmission unit 1 determines whether a terminal to which control data is transmitted is the first terminal 21 or the second terminal 22 based on the response data from the first monitoring terminal 211, and if the terminal is determined to be the second terminal 22, the transmission unit 1 transmits the securing data from the segment securing unit 17 in the subsequent transmission segment 103 (that is, the first transmission segment 103 thereafter). In short, the transmission unit 1, when the response data (load number) from the first monitoring terminal 211 corresponds to the address area ("65" to "128") of the second terminal 22 in the control table, transmits the securing data in the subsequent transmission segment 103 (that is, the first transmission segment 103 thereafter) with this response data as a trigger. Accordingly, the transmission unit 1 can secure the reply segment 104 for transmitting control data to the second terminal 22.

The superimposition communication unit 16 is configured to transmit control data to the second control terminal 222 with the superimposition signal in the reply segment 104 secured by the securing data, that is in the subsequent reply segment 104 after the transmission segment 103 in which the securing data is transmitted. Therefore, in this reply segment 104, control data can be transmitted from the transmission unit 1 to the second terminal 22 without the response data from the first terminal 21 interfering with the superimposition signal.

Further, some second control terminals 222 may transmit confirmation data, such as ACK (ACKnowledgement) data, to the transmission unit 1, in response to the control data from the superimposition communication unit 16. When this type of second control terminal 222 is a subject, the segment securing unit 17 is preferably configured to transmit the securing data again in a subsequent transmission segment 103 after the reply segment 104 in which the control data has been transmitted (that is, a transmission segment 103 in a frame subsequent to a frame including the reply segment 104 in which the control data has been transmitted), in order to secure a reply segment 104, for receiving the confirmation data from the second control terminal 222 with the superimposition signal. Accordingly, the transmission unit 1 can also avoid interference, in the reply segment 104, between the confirmation data transmitted from the second control terminal 222, using the superimposition signal, and the response data transmitted from the first terminal 21.

When an amount of the control data is relatively small and accordingly transmission of the control data is completed with only part of the reply segment 104, the second control terminal 222 may be configured to transmit the confirmation data, such as ACK data, using the remaining period after the transmission of the control data in the same reply segment 104. In this case, both of transmissions can be completed in one reply segment 104: a transmission of the control data from the transmission unit 1 to the second control terminal 222; and a transmission of the confirmation data from the second control terminal 222 to the transmission unit 1. Therefore, it is not required that the segment securing unit 17 transmits the securing data again in a subsequent transmission segment 103 after the reply segment 104 in which the control data has been transmitted.

As described above, when an amount of data to be transmitted is too large to be transmitted in one reply segment 104, the superimposition communication unit 16 of the transmission unit 1 is configured to transmit the remaining data in the subsequent reply segment 104. In view of this, the segment securing unit 17 is configured to be capable of changing a frequency of transmission of the securing data, according to the amount of the data to be transmitted to the second terminal 22, so that the reply segment 104 is secured longer in accordance with increase of the amount of the data to be transmitted to the second terminal 22. That is, the segment securing unit 17 is configured to determine the frequency of transmission of the securing data, from one to a plurality of frequencies, to secure, for superimposition of the superimposition signal, all of plural reply segments 104 that are required for the data to be transmitted to the second terminal 22.

For example when the data has a data amount that can be transmitted with one reply segment 104, the segment securing unit 17 determines that the frequency of transmission of the securing data is one. When the data has a data amount that can be transmitted with two reply segments 104, the segment securing unit 17 determines that the frequency of transmission of the securing data is two. Therefore, even when the transmission of the data is not completed with one reply segment 104, the superimposition communication unit 16 can transmit the superimposition signal to the second terminal 22, while avoiding interference, in the reply segment 104, between the response data transmitted from the first terminal 21 to the transmission unit 1 and the superimposition signal.

When receiving the response data in an identical reply segment 104 from first monitoring terminals 211, the response receiving unit 13 is configured to preferentially handle the response data transmitted from a first monitoring terminal 211 having a higher priority level, from among priority levels that are previously associated with addresses of the first monitoring terminals respectively. That is, when the first monitoring terminals 211 accidentally have generated interrupt signals in an identical interrupt segment 105, the response data may be transmitted simultaneously, in a reply segment 104 after the interrupt segment 105, from the first monitoring terminals 211 to the transmission unit 1. In such a case, the transmission unit 1 operates preferentially according to the response data transmitted from a first monitoring terminal 211 having a smaller address number.

Therefore, for example even when receiving the response data associated with the second terminal 22 in the control table, the transmission unit 1 does not make the segment securing unit 17 transmit the securing data in a case where the response data from other first monitoring terminal 211 is handled preferentially. Accordingly, the transmission unit 1 can transmit the securing data as necessary, even when receiving the response data in the identical reply segment 104 from the first monitoring terminals 211.

Figure 5:
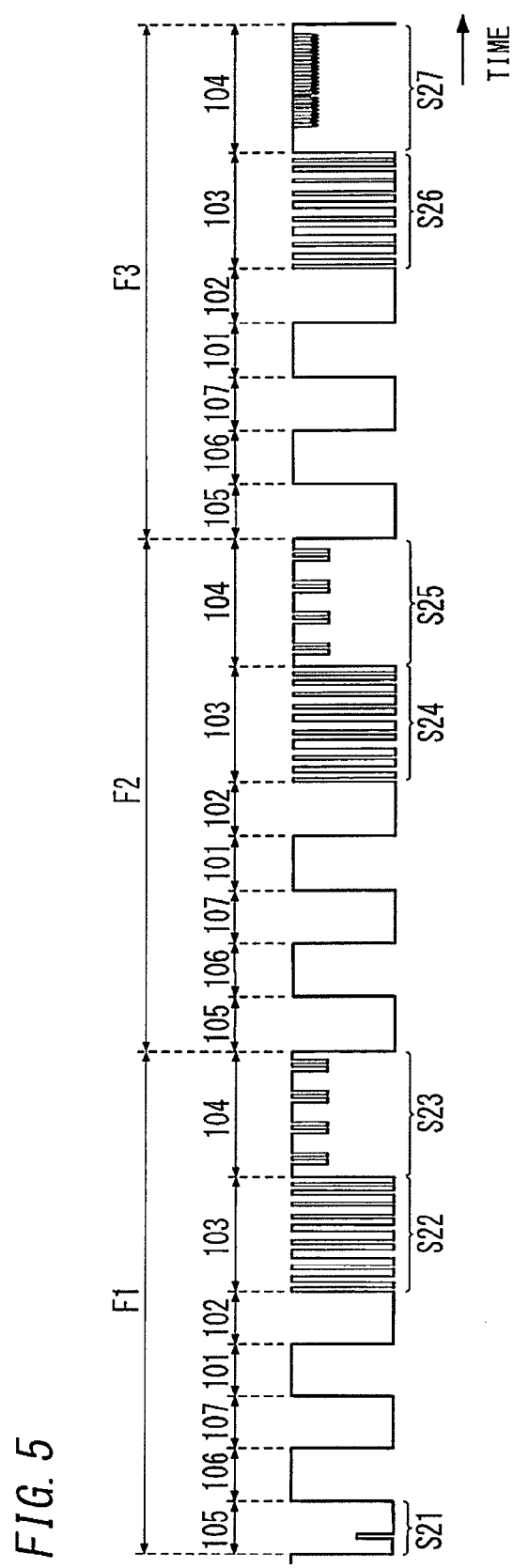
FIG. 5 is an explanatory diagram illustrating an operation of the communication system according to Embodiment 1.
Figure 6:
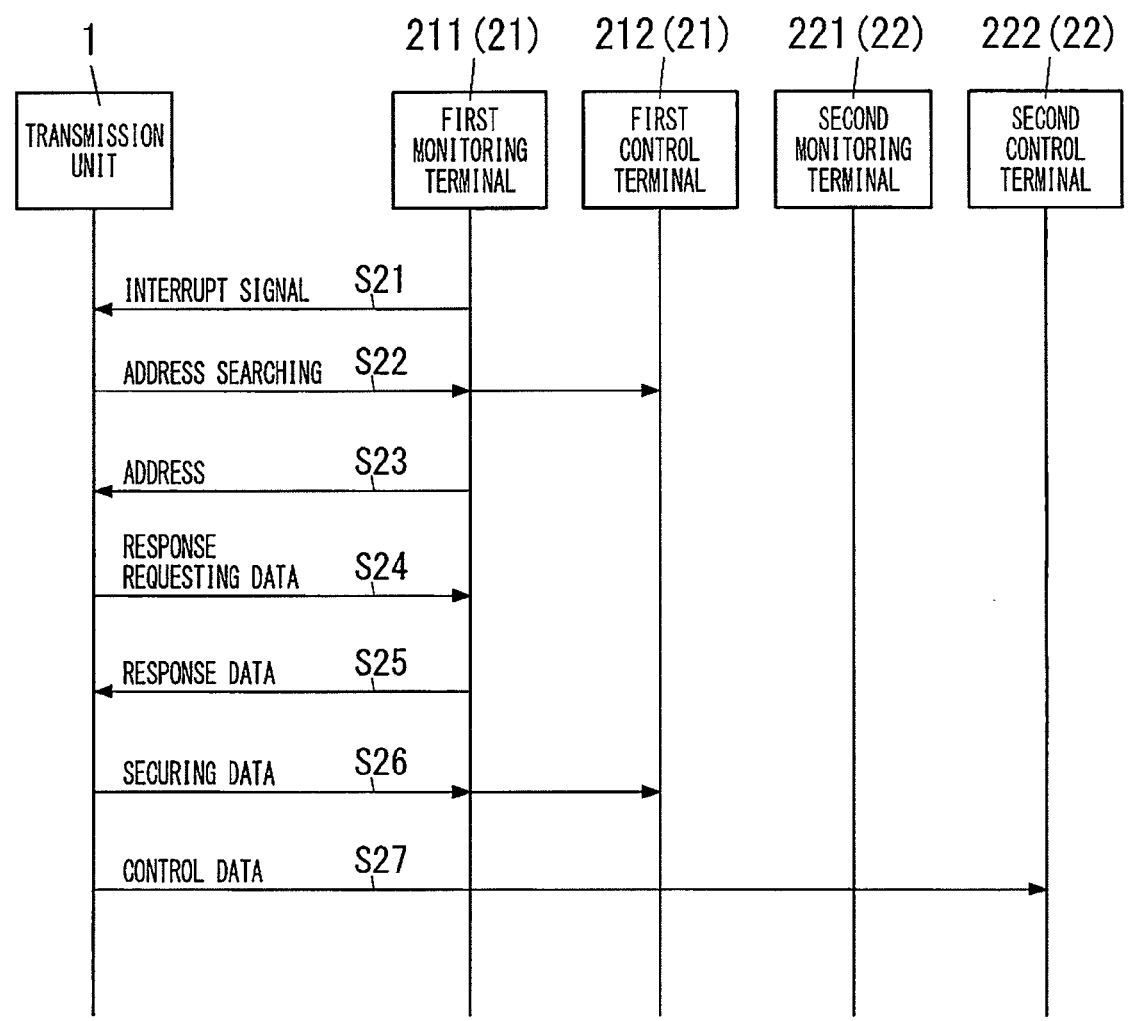
FIG. 6 is an explanatory diagram illustrating the operation of the communication system according to Embodiment 1.

Hereinafter, an operation, in the communication system shown in FIG. 1, in a case where the lighting apparatus 3 connected to the second control terminal 222 is controlled according to a monitoring input generated in the first monitoring terminal 211 will be described with reference to FIGS. 5 and 6. Because operations in "S21" to "S25" shown in FIGS. 5 and 6 are similar to those in "S11" to "S15" shown in FIGS. 3 and 4 described as the operation of the basic system, descriptions thereof are omitted here.

The transmission unit 1, upon receiving, as response data, monitoring data from the first monitoring terminal 211 in "S25" of the second frame F2, determines whether a terminal that is associated with this monitoring data (load number) in the control table is the first control terminal 212 or the second control terminal 222. If the terminal is determined to be associated with the second control terminal 222, the transmission unit 1 transmits the securing data from the segment securing unit 17 in the transmission segment 103 of the third frame F3 (S26 in FIGS. 5 and 6).

Accordingly, the reply segment 104 subsequent to the transmission segment 103 in which the securing data is transmitted is secured for superimposition of the superimposition signal, and the transmission unit 1 transmits the control data to the second control terminal 222 in this reply segment 104 (of the third frame F3) with the superimposition signal (S27). The second control terminal 222 that has received the control data performs dimming control and/or color adjustment control of the lighting apparatus 3 according to the control data.

According to the communication system described above, the transmission unit 1 includes the superimposition communication unit 16, and further in the control table an address of the first monitoring terminal 211 is associated with an address of the second control terminal 222. Therefore, transmission and reception of data can be performed between the first terminal 21 and the second terminal 22. Accordingly, the transmission unit 1 can control the load (lighting apparatus 3) connected to the second control terminal 222, according to the monitoring input generated by the first monitoring terminal 211. That is, according to the communication system of the present embodiment, a flexible system can be provided, such that the system is capable of controlling the apparatus connected to the second terminal 22, based on data input from the first terminal 21 to the transmission unit 1. Specifically, for example, the transmission unit 1 can transmit, to the second control terminal 222, the control data, such as dimming control data or color adjustment control data, having a relatively large data amount, according to the monitoring data having a relatively small data amount, which indicates an on/off state of a switch from the first monitoring terminal 211.

Moreover, in the present embodiment, the reply segment of the transmission signal is used for transmitting the superimposition signal and the transmission unit 1 includes the segment securing unit 17 that transmits the securing data so as to secure the subsequent reply segment 104 (that is, the first reply segment 104 thereafter) for superimposition of the superimposition signal with specific response data from the first terminal 21 as a trigger. Therefore, the superimposition communication unit 16 can transmit the superimposition signal to the second terminal 22, while avoiding interference, in the reply segment 104, between the response data transmitted from the first terminal 21 to the transmission unit 1 and the superimposition signal.

Here, in the above-mentioned embodiment, the segment securing unit 17 is configured to transmit the securing data, with the response data including the monitoring data as a trigger (specific response data), but is not limited to this. The segment securing unit 17 may be configured to transmit the securing data, with the response data including data other than the monitoring data as the trigger.

Figure 7:
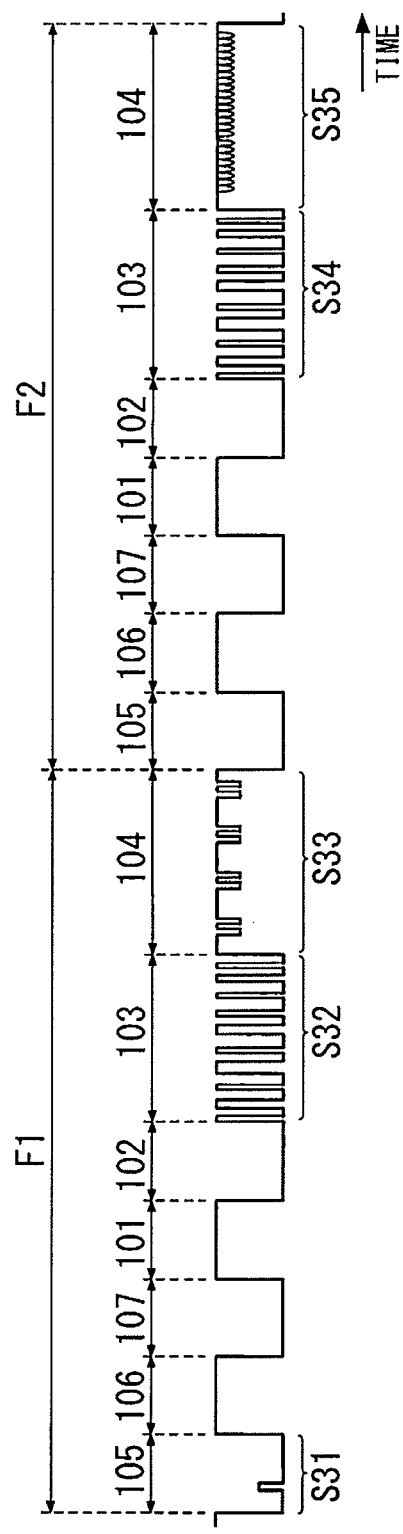
FIG. 7 is an explanatory diagram illustrating another operation of the communication system according to Embodiment 1.

As one example, as shown in FIG. 7, the segment securing unit 17 is configured to transmit the securing data, using, as the trigger, the response data including an address (lower bits) of a first monitoring terminal 211 that has been transmitted by the terminal 211 in response to the address searching. This is useful for a case where an address unique to the first monitoring terminal 211 is associated in one-to-one with an address of the second control terminal 222, in a configuration such that the first monitoring terminal 211 monitors presence or absence of an alarm of a sensor, as the monitoring input. That is, in this case, it is not required that the first monitoring terminal 211 transmits, to the transmission unit 1, the monitoring data including the load number or ON/OF state. Accordingly, the response data including the address of the first monitoring terminal 211 can be directly associated with the control data addressed to the second control terminal 222.

In the example of FIG. 7, when detecting, in the interrupt segment 105 of the first frame F1, an interrupt signal that has been generated by a first monitoring terminal 211 (S31 in FIG. 7), the transmission unit 1 switches the mode data included in the transmission segment 103 of the transmission signal from the normal mode to the interrupt polling mode. In the interrupt polling mode, the transmission unit 1 performs address searching in which the response requesting data composed of upper bits of an address is transmitted with the response requesting unit 12 in the transmission segment 103 of the transmission signal (S32), while the address (upper bits) being changed sequentially. The first monitoring terminal 211 that has generated the interrupt signal transmits lower bits of its own address as the response data to the transmission unit 1, in the reply segment 104 of the first frame F1, if the address (upper bits) in the response requesting data matches upper bits of its own address (S33). Accordingly, the transmission unit 1 receives, with the response receiving unit 13, the address of the first monitoring terminal 211 that has generated the interrupt signal in the first frame F1, as the response data.

When receiving, as the response data, the address (lower bits) from the first monitoring terminal 211, the transmission unit 1 determines whether the address is associated with the first control terminal 212 or second control terminal 222 in the control table. At this time, when determining that the address is associated with the second control terminal 222, the transmission unit 1 makes the segment securing unit 17 transmit the securing data in a transmission segment 103 of the second frame F2 subsequent to the first frame F1 (S34).

Accordingly, a subsequent reply segment 104 after the transmission segment 103 in which the securing data has been transmitted is secured for superimposition of the superimposition signal. The transmission unit 1 then transmits the control data to the second control terminal 222, in the reply segment 104 (of the second frame F2), by the superimposition signal (S35). The second control terminal 222 that has received the control data performs the dimming control or color adjustment control for the lighting apparatus 3, according to the control data.

In this way, even when using the response data including data other than the monitoring data as the trigger, the superimposition communication unit 16 can transmit the superimposition signal to the second terminal 22, while avoiding interference, in the reply segment 104, between the response data transmitted from the first terminal 21 to the transmission unit 1 and the superimposition signal.

(Embodiment 2)

A communication system of the present embodiment is different from that of Embodiment 1 in that a first monitoring terminal 211 further has a function as a second terminal 22 that communicates by a superimposition signal superimposed on a transmission signal. Hereinafter, configuration elements similar to Embodiment 1 are assigned with same reference numerals, and explanations thereof will be appropriately omitted.

In the present embodiment, at least a part of first monitoring terminals 211 includes a superimposition communication circuit (not shown) that performs communication conforming to a second protocol, with the superimposition signal. Accordingly, a transmission unit 1 can perform the communication conforming to the second protocol, through a superimposition communication unit 16, with not only the second terminal 22 but also at least the part of the first monitoring terminals 211. A first monitoring terminal(s) 211 that includes the superimposition communication circuit is configured to be capable of transmitting monitoring data to the transmission unit 1, with the superimposition signal, and capable of receiving monitoring requesting data from the transmission unit 1, with the superimposition signal.

Figure 8:
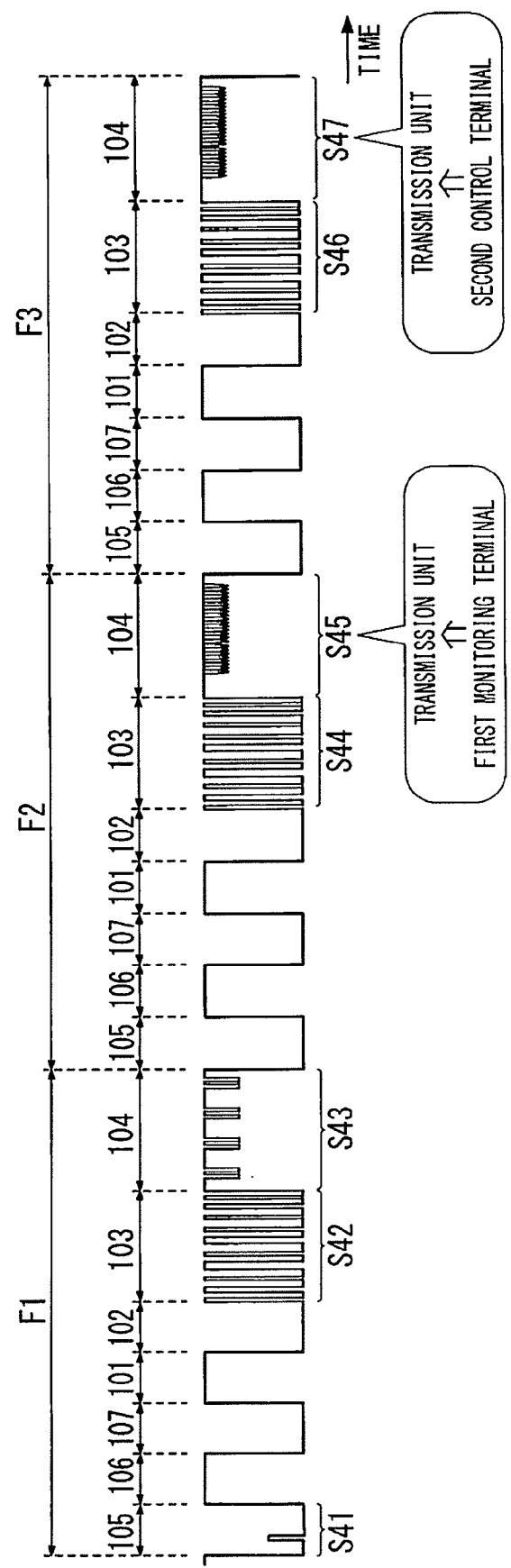
FIG. 8 is an explanatory diagram illustrating an operation of a communication system according to Embodiment 2.

An operation of the communication system according to the present embodiment will be described below with reference to FIG. 8, in a case of controlling a lighting apparatus 3 connected to a second control terminal 222, according to a monitoring input that has been generated by the first monitoring terminal 211 including the superimposition communication circuit.

When detecting an interrupt signal that has been generated by the first monitoring terminal 211, in an interrupt segment 105 of a first frame F1 of a transmission signal (S41 in FIG. 8), the transmission unit 1 switches mode data that is included in a transmission segment 103 of the transmission signal, from a normal mode to an interrupt polling mode. In the interrupt polling mode, the transmission unit 1 performs address searching in which response requesting data composed of upper bits of an address is transmitted with a response requesting unit 12 in the transmission segment 103 of the transmission signal (S42), while the address (upper bits) being changed sequentially. The first monitoring terminal 211 that has generated the interrupt signal transmits lower bits of its own address as response data to the transmission unit 1, in a reply segment 104 of the first frame F1, if the address (upper bits) in the response requesting data matches upper bits of its own address (S43). Accordingly, the transmission unit 1 receives, with a response receiving unit 13, the address of the first monitoring terminal 211 that has generated the interrupt signal in the first frame F1, as the response data.

When acquiring the address of the first monitoring terminal 211 that has generated the interrupt signal, the transmission unit 1 transmits, with the response requesting unit 12, the response requesting data to the first monitoring terminal 211, by designating the address in a transmission segment 103 of a second frame F2 subsequent to the first frame F1 (S44). Here, the response requesting data includes a superimposition response frag, and the response requesting unit 12 turns on the superimposition response flag when requesting a reply of the monitoring data with the superimposition signal. Specifically, the transmission unit 1 determines on/off of the superimposition response frag based on the acquired address of the first monitoring terminal 211, so as to turn on the superimposition response frag for a first monitoring terminal 211 that includes a superimposition communication circuit.

The first monitoring terminal 211, upon receiving the response requesting data in which its own address has been designated, confirms the superimposition response frag. If the superimposition response frag is on, the first monitoring terminal 211 transmits, in response thereto, monitoring data that includes a load number corresponding to a monitoring input, with the superimposition signal to the transmission unit 1, as the response data, in the reply segment 104 of the second frame F2 (S45). At this time, since the monitoring data is transmitted with the superimposition signal, the first monitoring terminal 211 can transmit monitoring data having a relatively large data amount, such as a measured value (illuminance or the like) of a sensor (e.g., an illuminance sensor or the like).

The transmission unit 1, upon receiving the response data including the monitoring data with the superimposition communication unit 16, determines whether a terminal associated with this monitoring data (load number) in the control table is a first control terminal 212 or the second control terminal 222. If the terminal is determined to be the second control terminal 222, the transmission unit 1 makes a segment securing unit 17 transmit securing data, in a transmission segment 103 of a third frame F3 subsequent to the second frame F2 (S46). Accordingly, a subsequent reply segment 104 after the transmission segment 103 in which the securing data is transmitted is secured for superimposition of the superimposition signal, and the transmission unit 1 transmits the control data to the second control terminal 222 in this reply segment 104 (of the third frame F3) with the superimposition signal (S47). The second control terminal 222 that has received the control data performs dimming control and/or color adjustment control of the lighting apparatus 3 according to the control data.

Next, as another example, an operation in a case where the transmission unit 1 transmits the monitoring requesting data to the first monitoring terminal 211 with the superimposition signal will be described with reference to FIG. 9. Note that since operations in "S51" to "S53" and "S58" to "S59" in FIG. 9 are similar to those in "S41" to "S43" and "S46" to "S47" in FIG. 8, description thereof will be omitted here.

Figure 9:
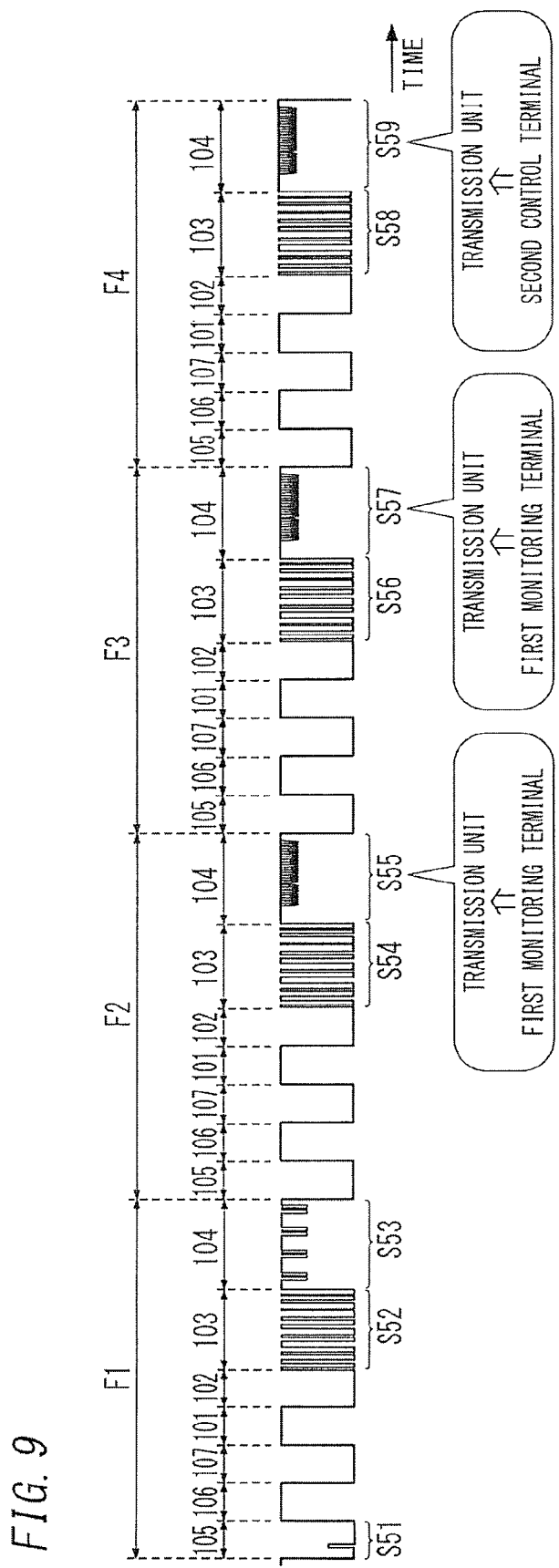
FIG. 9 is an explanatory diagram illustrating another operation of the communication system according to Embodiment 2.

The transmission unit 1, upon acquiring in "S53" an address of a first monitoring terminal 211 that has generated an interrupt signal, transmits securing data from the segment securing unit 17 in a transmission segment 103 of a second frame F2 (S54 in FIG. 9). Accordingly, since a subsequent reply segment 104 after the transmission segment 103 in which the securing data is transmitted is secured for superimposition of the superimposition signal, the transmission unit 1 transmits the monitoring requesting data to the first monitoring terminal 211 in this reply segment 104 (of the second frame F2) with the superimposition signal (S55). Here, the monitoring requesting data is data for specifying contents of the monitoring data that is transmitted from the first monitoring terminal 211, and includes time information, sensor information, location information and the like that are set in detail.

Further, the transmission unit 1, upon transmitting the monitoring requesting data, receives the monitoring data from the first monitoring terminal 211, in the subsequent reply segment 104 (that is, the first reply segment 104 thereafter), with the superimposition signal. Accordingly, the transmission unit 1 transmits securing data from the segment securing unit 17 in a transmission segment 103 of a third frame F3 subsequent to the second frame F2 (S56). The first monitoring terminal 211 that has received the monitoring requesting data transmits the monitoring data relating to the specified contents in the monitoring requesting data, as the response data, to the transmission unit 1 with the superimposition signal, in a reply segment 104 of the third frame F3 that has been secured for superimposition of the superimposition signal through the securing data (S57).

According to the communication system with the configuration described above, since the first monitoring terminal 211 can transmit the monitoring data to the transmission unit 1 with the superimposition signal, it is possible to transmit the monitoring data having a relatively large data amount, such as a measured value of a sensor. Furthermore, since the transmission unit 1 can transmit the monitoring requesting data to the first monitoring terminal 211 with the superimposition signal, it is possible to set necessary contents of the monitoring data relatively in detail.

The other configurations and functions are similar to those of Embodiment 1.

In each of the above embodiments, an exemplary configuration is illustrated in which the superimposition communication unit 16 is incorporated in the transmission unit 1. However, the configuration is not limited thereto, and the superimposition communication unit may be provided separately from the transmission unit 1 and be connected to the transmission unit 1.

Although the present invention has been described with a number of preferred embodiments, various modifications and variations are possible by those skilled in the art without departing from the spirit or scope of the invention, that is, without departing from the claims.

The invention claimed is:

1. A communication system, comprising a transmission unit that repeatedly transmits a transmission signal to a communication line, a first terminal that communicates by the transmission signal, and a second terminal that communicates by a superimposition signal that is superimposed on the transmission signal, said transmission unit, said first terminal and said second terminal being connected to said communication line, wherein the transmission signal is a time-division signal that is divided, frame by frame, into a plurality of regions in a time axis direction, the plurality of regions including:

an interrupt segment for detecting presence or absence of an interrupt signal that is generated by said first terminal;

a transmission segment for transmitting data to said first terminal; and a reply segment that is a time slot for receiving response data from said first terminal, and wherein said transmission unit includes:

a response requesting unit configured to transmit, when detecting the interrupt signal in the interrupt segment, response requesting data to said first terminal in the transmission segment with the transmission signal;

a response receiving unit configured to receive the response data that is transmitted in the reply segment with the transmission signal, in response to the response requesting data, by said first terminal that has generated the interrupt signal;

a segment securing unit configured to transmit, in the transmission segment with the transmission signal, securing data for securing the reply segment for superimposition of the superimposition signal, by prohibiting transmission of the response data in the reply segment, with specific response data as a trigger; and a superimposition communication unit configured to transmit, to said second terminal, data in the reply segment secured through the securing data, with the superimposition signal.

2. The communication system according to claim 1, wherein said segment securing unit is configured to determine a frequency of transmission of the securing data, from one to a plurality of frequencies, according to an amount of the data to be transmitted to said second terminal, so that the reply segment is secured longer in accordance with increase of the amount of the data to be transmitted to said second terminal.

3. The communication system according to claim 1, wherein when said second terminal transmits confirmation data to said superimposition communication unit in response to the data transmitted from said superimposition communication unit, said segment securing unit is configured to transmit the securing data again in a subsequent transmission segment after the reply segment in which the data has been transmitted from said superimposition communication unit, in order to secure, for receiving the confirmation data, a subsequent reply segment after the subsequent transmission segment.

4. The communication system according to claim 2, wherein when said second terminal transmits confirmation data to said superimposition communication unit in response to the data transmitted from said superimposition communication unit, said segment securing unit is configured to transmit the securing data again in a subsequent transmission segment after the reply segment in which the data has been transmitted from said superimposition communication unit, in order to secure, for receiving the confirmation data, a subsequent reply segment after the subsequent transmission segment.

5. The communication system according to claim 1, wherein when receiving the response data in an identical reply segment from more than one said first terminal, said response receiving unit is configured to preferentially handle the response data transmitted from a first terminal having a higher priority level, from among priority levels that are previously associated with addresses of more than one said first terminal respectively.

6. The communication system according to claim 1, wherein said first terminal comprises:

a first monitoring terminal configured to monitor a monitoring input that is generated by a switch or a sensor, transmit the interrupt signal to said transmission unit, and transmit the response data in response to the response requesting data; and a first control terminal configured to receive control data from said first monitoring terminal through said transmission unit, and control one or more first loads based on the control data, wherein said second terminal comprises a second control terminal configured to control one or more second loads based on control data that is included in the superimposition signal transmitted from said transmission unit, and wherein said transmission unit is configured to store a control table in which an address of said first monitoring terminal is associated with an address of said second control terminal, said transmission unit being configured to determine, based on the control table, whether a transmission destination of control data included in the response data received from said first monitoring terminal is said first control terminal or said second control terminal, and make said segment securing unit transmit the securing data when determining that the transmission destination is said second control terminal.

7. A transmission unit used for a communication system in which a first terminal that communicates by a transmission signal and a second terminal that communicates by a superimposition signal superimposed on the transmission signal are connected to a communication line,
the transmission unit being connected to said communication line,
the transmission unit comprising:
a transmission communication unit configured to repeatedly transmit, to said communication line, the transmission signal that is a time-division signal divided, frame by frame, into a plurality of regions in a time axis direction, the plurality of regions including an interrupt segment for detecting presence or absence of an interrupt signal that is generated by said first terminal, a transmission segment for transmitting data to said first terminal, and a reply segment that is a time slot for receiving response data from said first terminal;
a response requesting unit configured to transmit, when detecting the interrupt signal in the interrupt segment, response requesting data to said first terminal in the transmission segment with the transmission signal;
a response receiving unit configured to receive the response data that is transmitted in the reply segment with the transmission signal, in response to the response requesting data, by said first terminal that has generated the interrupt signal;
a segment securing unit configured to transmit, in the transmission segment with the transmission signal, securing data for securing the reply segment for superimposition of the superimposition signal, by prohibiting transmission of the response data in the reply segment, with specific response data as a trigger; and
a superimposition communication unit configured to transmit, to said second terminal, data in the reply segment secured through the securing data, with the superimposition signal.

8. The communication system according to claim 2, wherein when receiving the response data in an identical reply segment from more than one said first terminal, said response receiving unit is configured to preferentially handle the response data transmitted from a first terminal having a higher priority level, from among priority levels that are previously associated with addresses of more than one said first terminal respectively.

9. The communication system according to claim 3, wherein when receiving the response data in an identical reply segment from more than one said first terminal, said response receiving unit is configured to preferentially handle the response data transmitted from a first terminal having a higher priority level, from among priority levels that are previously associated with addresses of more than one said first terminal respectively.

10. The communication system according to claim 4, wherein when receiving the response data in an identical reply segment from more than one said first terminal, said response receiving unit is configured to preferentially handle the response data transmitted from a first terminal having a higher priority level, from among priority levels that are previously associated with addresses of more than one said first terminal respectively.

* * * * *